United States Patent [19]

Davies

[11] Patent Number: 4,991,018
[45] Date of Patent: Feb. 5, 1991

[54] TELETEXT DECODER WITH IMPROVED PROCESSOR WHICH DETERMINES THE BEGINNING AND END OF A TELETEXT PAGE

[75] Inventor: Andrew K. Davies, Purley, England

[73] Assignee: U.S. Philips Corporation, New York, N.Y.

[21] Appl. No.: 453,035

[22] Filed: Dec. 11, 1989

Related U.S. Application Data

[63] Continuation of Ser. No. 104,324, Oct. 2, 1987, abandoned.

[30] Foreign Application Priority Data

Oct. 3, 1986 [GB] United Kingdom ............... 8623821

[51] Int. Cl.⁵ .................................. H04N 7/04
[52] U.S. Cl. ............................ 358/147; 358/142
[58] Field of Search .................. 358/142, 146, 147

[56] References Cited

FOREIGN PATENT DOCUMENTS 2146878 4/1985 United Kingdom ............. 358/142

OTHER PUBLICATIONS

D'Amato, "A Software-Oriented Dual Standard Teletext Decoder", Rev. HF (Belgium), vol. 11, #11 pp. 373-380, 1981.

British Broadcasting Corporation et al., *Broadcast Teletext Specification* (Sept., 1986).
U.K. Department of Trade and Industry, *World System Teletext Technical Specification* (March, 1985).
Specifications for the Philips MAB84XX chip.
Specifications for the Mullard SAA5230 chip.
Specifications for the Mullard SAA5240 chip.

*Primary Examiner*—James J. Groody
*Assistant Examiner*—David E. Harvey
*Attorney, Agent, or Firm*—Anne E. Barschall

[57] ABSTRACT

As shown in FIG. 2, a teletext decoder has a multi-page memory (MEM) comprising a plurality of memory portions (CH0 to CH3) in which individual pages can be stored on a priority basis. The numbers of selected pages are entered into page request registers (PR0 to PR3) and when the number of a selected page is detected by the relevent one of page comparators (PC0 to PC3) a found bit (FB) is produced by the relevant one of flip-flops (FB0 to FB3) and recorded in the memory portion allotted to the selected page by processor means (PM). In order to ensure that the end of a selected page can also be detected, one of the memory portions is allotted to store every page received so that a found bit is always produced at the end of a selected page stored in another memory portion. The processor means (PM) uses this latter found bit to signify detection of the end of the selected page.

16 Claims, 4 Drawing Sheets

TELETEXT DECODER WITH IMPROVED PROCESSOR WHICH DETERMINES THE BEGINNING AND END OF A TELETEXT PAGE

This is a continuation of application Ser. No. 104,324, filed Oct. 2, 1987, now abandoned.

BACKGROUND OF THE INVENTION

1. Field of the Invention

This invention relates to teletext decoders for receiving, storing and processing teletext information which is transmitted as digitally coded data and comprises a plurality of different pages each of which is identified by a respective page number. Transmissions of teletext information are in television signals in television lines where no picture signals representing normal television picture information are present. These television lines are referred to as data-lines.

2. Related Art

The document "Broadcast Teletext Specification", September 1976, published jointly by the British Broadcasting Corporation, Independent Broadcasting Authority and British Radio Equipment Manufacturers' Association, discloses a specification for transmitting teletext information in 625-line television systems.

In the above-identified document "Broadcast Teletext Specification", a quantity of teletext information to be considered as an entity is termed a page and will be so termed herein. All of the pages which are available are normally transmitted in a recurrent cycle, with or without up-dating page information, as appropriate. At a teletext decoder any page can be selected, and the digitally coded data representing the page information is then acquired by the teletext decoder from the cyclic transmission and is stored in a page memory of the teletext decoder for as long as the page is required. A teletext decoder may have a multi-page memory having a plurality of memory portions in which individual pages can be stored. These memory portions may be used on a priority basis, that is, if two (or more) memory portions are allotted to store the same selected page, then priority logic in the decoder allows only one portion to receive the page in preference to the other(s).

The pages are organised into different magazines (or groups) and each page consists of up to 24 data rows. The first data row (Row 0) of each page is termed a page-header and contains inter alia the page number. The transmission of each page begins with, and includes, its page-header and ends with, and excludes, the next page-header which is transmitted in respect of a page in the same magazine. Thus, it is assumed that all of the data rows containing the relevant magazine number which are transmitted between two such successively transmitted different page-headers belong to the page having the first page-header.

Proposals for enhancing the teletext specification given in the "Broadcast Teletext Specification" document are given in the document "World System Teletext Technical Specification", March 1985, compiled by the Department of Trade and Industry. One of these enhancement proposals concerns the provision of a conditional access teletext service in which teletext message information in data pages is scrambled prior to transmission, and can only be received as useful information by a teletext decoder having an appropriate descrambling key. Such a descrambling key is itself transmitted as encrypted teletext information in the data page concerned, whilst other keys which are provided to regulate the conditional access to transmitted teletext message information are transmitted in encrypted control pages. Decryption therefore has also to be performed within the teletext decoder.

The reception and processing of the scrambled data pages and the encrypted control pages necessitates the use of a type of teletext decoder which includes processor means for carrying out the descrambling and decryption. The actual reception of the data pages and control pages can be carried out by dedicated hardware circuits of the teletext decoder, albeit under the control of the processor means.

A problem that has been encountered in the realisation of a teletext decoder of this type is that the processor means needs to know when acquisition of a selected teletext page (control or data) has been completed before descrambling or decryption, as the case may be, of the teletext page can commence. This problem occurs because although the aforementioned page-header feature provides a specific page-found indication from which a 'page-found' signal can be produced directly to signify the start of a selected page, this feature does not provide a specific end-of-page indication at the end of the transmitted page from which an end-of-page signal can be produced directly at the end of a transmitted page.

SUMMARY OF THE INVENTION

It is an object of the present invention to provide a teletext decoder of the type set forth above which includes means for determining when all of the teletext information contained in selected page has been received by the teletext decoder.

According to the invention a teletext decoder for teletext information comprising a plurality of different pages each of which is identified by a respective page number, comprises:

processor means, a multi-page memory having a plurality of memory portions in which individual pages can be stored on a priority basis, means for selecting pages by their page number for storage in memory portions allotted by the processor means, and means responsive to the receipt of the page number of a selected page to record a found signal in respect of the memory portion allotted to that page, which teletext decoder is characterised in that said processor means is operable:

to allot a particular memory portion for the storage of any received page, to cause the selection means to select all the received pages of said plurality for storage in said particular memory portion, to signify the beginning of the storage of an individually selected page in another memory portion in response to the presence of a found signal in respect of that memory portion, and to signify the end of the storage of the selected page in response to the presence of a found signal in respect of said particular memory portion.

By causing any received page to be accepted and stored in said particular memory portion, it is ensured that a found signal is always produced at the end of an individually selected page, which found signal thus becomes an effective end of page signal for the selected page.

Because of the priority logic in the docoder, a page which is individually selected and has a memory portion allotted to it will be stored in that memory portion rather than in said particular memory portion. It therefore follows that when two different immediately adjacent pages are individually selected, each will have a respective memory portion allotted to it for storage therein and neither will be stored in said particular page.

Thus, in carrying out the invention, it is preferable to arrange the operation of the processor means such that the presence of a found signal is looked for in respect of both said particular memory portion and each other memory portion that may be allotted to an immediately following individually selected page.

Conveniently, the found signal is a single, found, bit which is stored in the memory portion to which it pertains, this found bit having one logic value when a page to which its memory portion has been allotted has not been found following its selection, and this found bit having the opposite logic value when the page number for that page has been received.

In order that the found bit pertaining to said particular memory portion is always at said one logic value prior to the receipt of the page number for the page immediately following a selected page, the processor means may be arranged to write a found bit of said one logic value into said particular memory portion each time the presence of a found bit of said opposite logic value is detected in the memory portion allotted to an individually selected page.

The beginning and end of the storage of an individually selected page can be signified in the processor means by the setting therein of respective flags. These flags may be respective single bits which are given one logic value when they are set and the opposite logic value when they are cleared.

BRIEF DESCRIPTION OF THE DRAWING

In order that the invention may be fully understood reference will now be made by way of example to the accompanying drawings, of which.

DETAILED DESCRIPTION OF THE PREFERRED EMBODIMENTS

Figure 1:
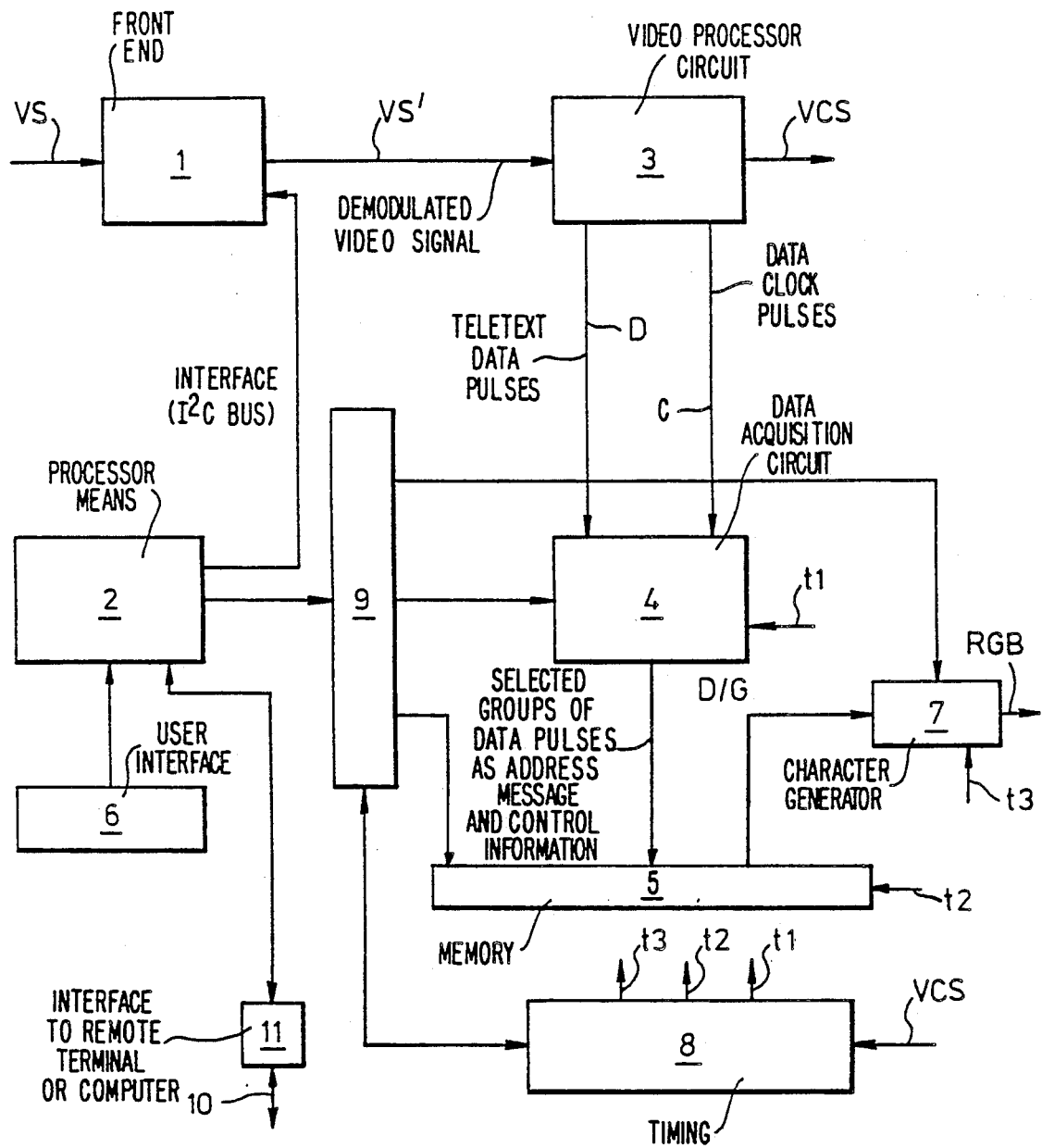
FIG. 1 is a block diagram of a teletext decoder in which the invention can be embodied.

Referring to the drawings, the teletext decoder shown in FIG. 1 has a front end 1 for receiving an incoming television signal VS. This front end 1 comprises the usual amplifying, tuning and i.f. detector circuits and is under tuning control of processor means 2. The demodulated video signal VS' produced at the output of the front end 1 is applied to a video processor circuit 3 which performs data slicing for retrieving teletext data pulses D from the video signal VS'. The video processor circuit 3 also produces input data clock pulses C from the data pulses D. The data pulses D are fed together with the clock pulses C to a data acquisition circuit 4 which is operable to feed selected groups D/G of the data pulses to a memory 5 as address, message and control information. The memory 5 has a capacity for storing at least four pages, comprising a plurality of data rows, in respective memory portions which are hereinafter referred to as "chapters". A page and row format according to the aforementioned "Broadcast Teletext Specification" is assumed.

The processor means 2 is operable in accordance with select signals applied to it from a user interface device 6 to control channel selection and which pages, as composed of the selected groups D/G of the data pulses, are acquired by the data acquisition circuit 4. The processor means 2 is further operable to read out from the memory 5 the control and message information which has been acquired. The message information is used to drive a character generator 7 which produces R,G,B, component signals for utilisation. A timing circuit 8 provides timing signals on connections t1, t2 and t3 for the circuit elements 4, 5 and 7. These circuit elements and the timing circuit 8 are accessed by the processor means 2 via an interface circuit 9. The operation of the timing circuit 8 is synchronised with the received video signal VS by a composite pulse signal VCS which contains the line and field synchronising pulses which are separated from the demodulated video signal VS' in the video processor circuit 3.

The operation of the processor means 2 may also be under the control of a remote terminal or computer which has access to the teletext decoder via a suitable two-way link 10 and interface 11, for instance an RS232 external link. Acquired teletext information can then be transmitted over this external link for utilisation remotely. Channel and page selection may also be effected from a remote terminal rather than by the interface device 6.

The processor means 2 can be a commercially available microcomputer; e.g. from the MAB 8400 Series (Philips). The circuit element can be the integrated circuit VIP2 type 5230 (Mullard); the circuit elements 4, 5 and 8 can be the integrated circuit EURO CCT type SAA 5240 (Mullard); and the interface circuit 9 can be a so-called I²C bus.

Figure 2:
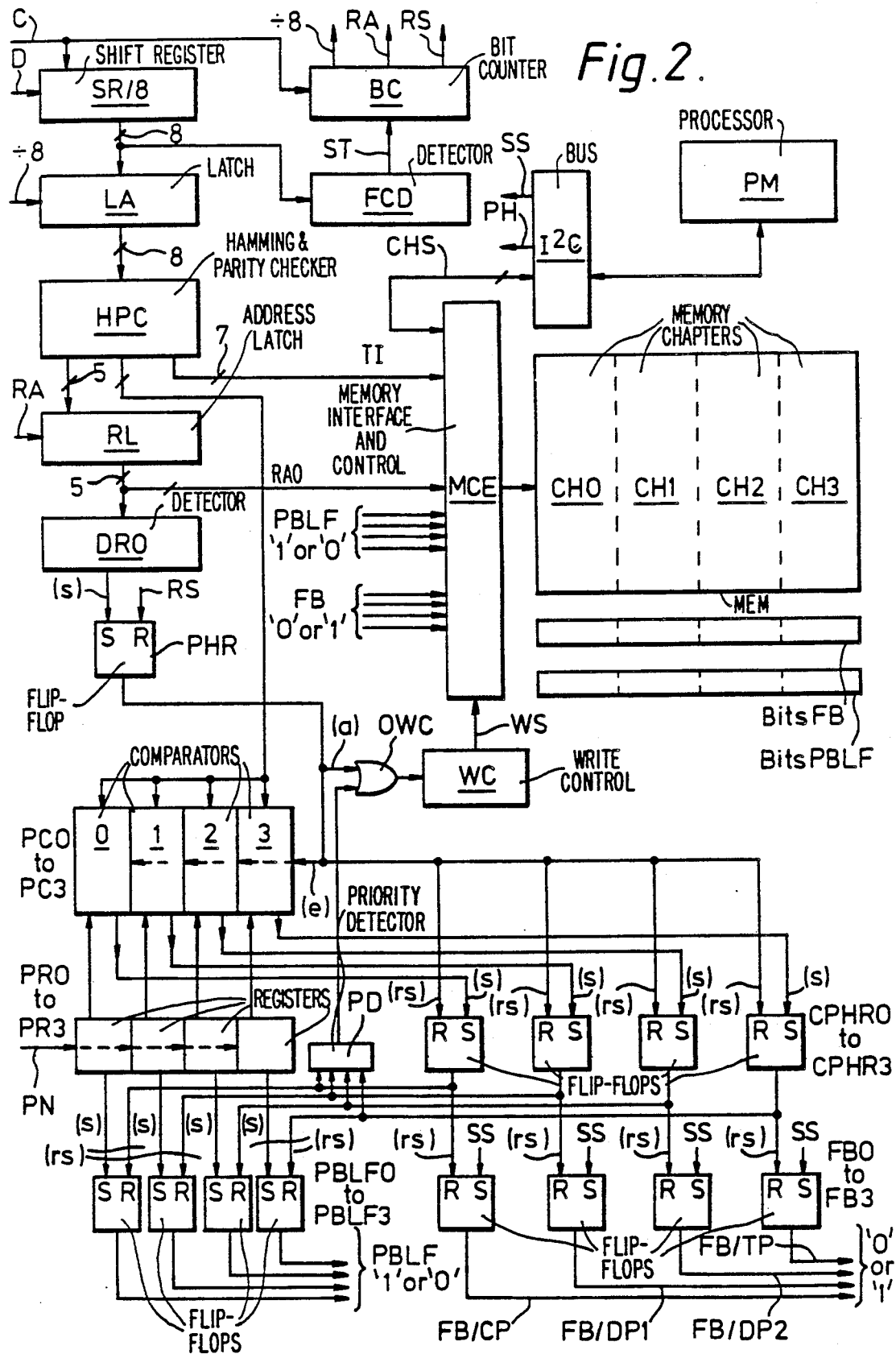
FIG. 2 is a block diagram showing elements of the teletext decoder of FIG. 1.

The block diagram of FIG. 2 shows elements of the data acquisition circuit (4 - FIG. 1) of the teletext decoder. An 8-bit shift register SR/8 has the received teletext data pulses D clocked into it by the clock pulses C. In the aforementioned "Broadcast Teletext Specification", each teletext data row includes for byte synchronisation an 8-bit framing code. This framing code is looked for by a framing code detector FCD and when it is found, this indicates the start of proper data on a data-line and a 'start' signal ST is applied by the detector FCD to a data bit counter BC. The bit counter BC is clocked by the clock pulses C and counts the teletext data pulses as they are clocked into the shift register SR/8. Various decodes from the bit counter BC provide pulses to other parts of the data acquisition circuit at certain times during the data-line. One of these decodes provides a signal ($\approx 8$) every eight clock pulses, and is used to clock the data pulses into an 8-bit latch LA. The serial teletext data pulse stream is thus broken up into 8-bit words. The 8-bit words are fed to a Hamming and parity checker HPC. Seven of the eight bits of words from the latch LA form data bytes of teletext information TI to be stored in the relevant chapters of a page memory MEM (5 - FIG. 1). This memory MEM has four chapters CH0 and CH3 for storing respective pages. The eighth bit is a parity bit, which is not stored but is used by the Hamming and parity checker HPC to test for odd parity in the words. The first two 8-bit words after the framing code on each data-line are used to define row and magazine addresses, which are protected by Hamming codes. The checker HPC effects Hamming correction for one bit errors and Hamming detection of two bit errors and produces two 4-bit corrected words of which 5 bits define row addresses and the remaining 3 bits define magazine addresses. These two addresses are clocked into respective row and magazine address latches. However, for the sake of simplicity there is shown in FIG. 2 only the row address latch RL which is clocked by row pulses RA from the bit counter BC to latch in successive 5-bit row addresses.

The row address output RAO from the latch RL identifies in various chapters the row addresses where the teletext information TI is to be stored in the memory MEM. The row address output RAO is also applied to a detector DRO which can detect the address of Row 0. When Row 0 (i.e. a page-header) is detected, the detector DRO produces a signal which 'sets' (s) a flip-flop PHR (page header received). The resulting signal from the flip-flop PHR 'enables' (e) a group of four page comparators PC0 to PC3, 'resets' (rs) a group of four flip-flops CPHR0-CPHR3 (correct page header received), and 'activates' (a) a write element WC via an OR-gate OWC. When activated, the element WC produces a 'write' signal WS which enables a memory interface and control element MCE to permit data (TI) in a detected page-header (Row 0) to be written into one of the chapters of the memory MEM. The particular one of four chapters concerned is determined by the processor means PM (2 - FIG. 1) by a chapter 'select' signal CHS which is applied to the element MCE from the processor means PM via the bus $I^2C$ (9 -FIG. 1).

Associated with the page comparators PC0 to PC3 are respective page request registers PR0 to PR3 into which the page numbers PN of selected pages are entered by the processor means PM. As already mentioned, a page may be selected directly from a user interface device (6 - FIG. 1). A page may also be selected by the processor means 2 in accordance with control information contained in a previously acquired page. When a page number is entered into one of the registers PR0 to PR3 an associated one of four flip-flops PBLF0 to PBLF3 (page being looked for) is set (s) and a PBLF bit of logic value '1' is entered into the associated one of the memory chapters CH0 to CH3.

Each page-header (Row 0) contains a Hamming protected page number which is compared in each of the comparators PC0 to PC3 with any page number that has been entered into the registers PR0 to PR3. If there is correspondence between any of the compared page numbers the or each comparator concerned 'sets' (s) the associated one of the four flip-flops CPHR0 to CPHR3. The resulting output signal from a set one of these flip-flops 'activates' (a) the write control element WC via the OR-gate OWC for all the following data-lines that contain the data rows of the selected page, until receipt of the next page-header (Row 0) causes the flip-flops which are set to be reset by the flip-flop PHR and thereby terminate the writing action. A reset pulse RS is applied to the flip-flop PHR at the end of every dataline by the bit counter BC. The activation of the write control element WC is in respect of an output signal from any of the flip-flops CPHR0 to CPHR3, but a priority detector PD to which these output signals are applied determines on a pre-selected priority basis into which memory chapter the selected page is to be written in the event that more than one of the flip-flops CPHR0 to CPHR3 signifies that a correct page header has been received.

The output signals from the set flip-flops CPHR0-CPHR3 are also used to 'reset' (rs) a respective one of the four flip-flops PBLF0 to PBLF3. This results in the relevant PBLF bit being changed from a logic value '1' to a logic value '0'. Finally, the output signals from the flip-flops CPHR0-CPHR3 reset (rs) respective flip-flops FB0 to FB3 to provide found bits FB of '0' logic value which are stored in the relevant memory chapter. These found bits FB and the bits PBLF are used by the processor means PM for data acquisition control. The bits PBLF are changed between the logic values '1' and '0' values as the flip-flops PBLF0 to PBLF3 are 'set' and 'reset' by the circuit action. However, this is not the case for the bits FB which, as stored, are only given the logic value '0' by the circuit action. A bit FB can only be changed to the logic value '1' by the processor means PM setting the relevant one of the flip-flops FB0 to FB3 using a setting signal SS. Three situations concerning the logic values of the bits FB and PBLF can be determined. Firstly, there is a normal situation in which a page has been received and all relevant control functions have been dealt with by the processor means PM. This is indicated by PBLF =0 and FB =1 (written by the processor means PM). Second, after a page has been requested and is being searched for, PBLF =1 and FB =1. Third, when a page has been received but the processor means PM has not yet observed the fact, this is indicated by PBLF =0 and FB =0.

When the processor means PM has dealt with any actions which are necessary on receipt of a page, it changes the relevant found bit FB to a logic value '1'. This then acts as a flag to signify to control software that such actions have been taken and it need not process that page again. Each time the page is subsequently received the found bit FB will be reset to the logic value '0', indicating to the processor means PM that action may be required (e.g. the page may be updated). If no special action is to be taken by the control software on receipt of a page there is no need for the processor means PM to set the found bit FB to a logic '1', and this bit will remain at the logic value '0' after the first reception of a page.

It can be seen from the foregoing description of the operation of the data acquisition circuit that the processor means PM can determine from the relevant bit PBLF whether or not a requested page is being looked for, as determined by the logic value '0' or '1' value of this bit, and it can determine from the logic value '0' of the found bit FB when a requested page has been found. The processor means PM cannot, however, determine when all the data rows of a found page have been received because the logic value of the found bit FB is not changed by the data acquisition circuit in response to receipt of a subsequent page header, which provides the assumption that all the data rows of the previous page have been sent.

Figure 3:
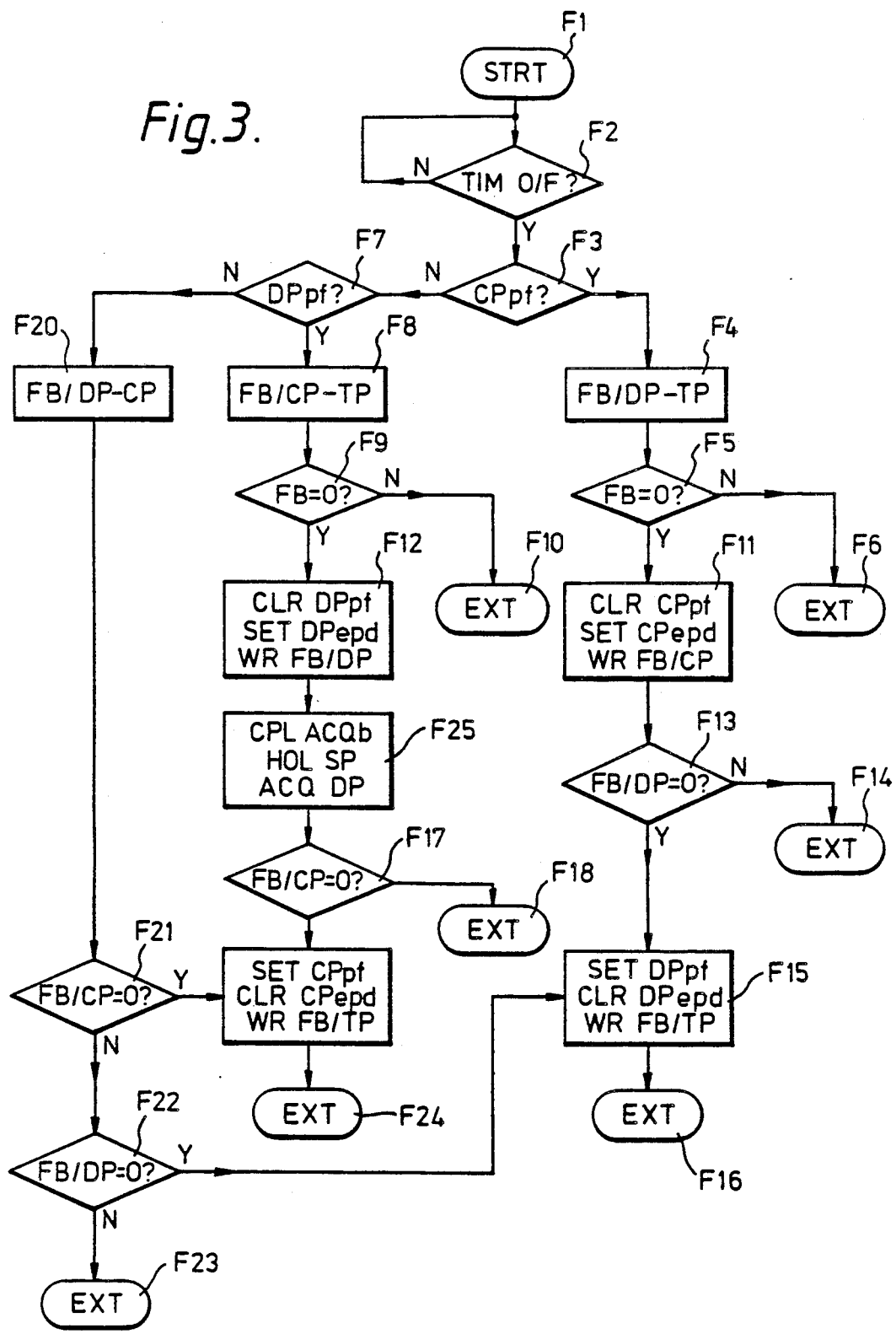
FIG. 3 is a flow chart showing operations of the processing means of the teletext decoder in the performance of the invention.

In accordance with the present invention, the control software of the processor means PM is organised so as to give an end-of-page indication. Such an indication has been found to be necessary when dealing with scrambled and encrypted teletext pages. The flow chart of FIG. 3 illustrates the control software which provides the end-of-page detection. For the purposes of the following description of the software control, it will be assumed that different teletext pages in a hexadecimal page number range 700 to 7FF are to be received by the teletext decoder, and that the processor means PM always allots the memory chapter CH0 for storing a control page (e.g. page 700), the memory chapters CH1 to CH2 for storing data pages, (e.g. 701, 702 . . . ), and the memory chapter CH3 for storing any page 7xx, in this number range. The processor means PM allots the memory chapters CH1 and CH2 alternately for the storage of selected data pages, by alternating the entry of individually selected data page numbers into the page request registers PR1 PR2. The page request register PR3 has all the page numbers of the range entered into it by the processor means PM.

In the flow chart of FIG. 3, the various boxes and the legends contained therein specify the control software programme steps as follows:

F1: STRT - this is an instruction to enter the programme.

F2: TIM 0/F? — this is an instruction to determine whether (Y) or not (N) a timer has timed-out.

(The purpose of the timer is to set a flag once every 20ms - i.e. once per television field - to identify the start of each vertical blanking interval. The timer is automatically reset after each interval, to remove the flag, and commences a new time-out period.

F3: CPpf? - this is an instruction to determine whether (Y) or not (N) a flag CPpf in the processor means PM has been set (=1) or cleared (=0). (When a control page CP is currently being acquired in the memory chapter CH0, as signified by FB/CP =0, this flag CPpf =1).

F4: FB/DP-TP - this step is entered into when the flag CPpf is set, and is an instruction requiring the processor means PM to get the found bit FB from the chapter memory CH1 (or CH2 as will be discussed) and also from the chapter memory CH3.

F5: FB=0? - this is an instruction to determine whether either of the found bits FB which have been obtained are at logic value '0'.

(When FB/DP1 =0 (or FBDP2 =0) in the chapter memory CH1 (or CH2) this signifies that a data page DP is stored or is being stored therein. Likewise, when FB/TP =0 in the chapter memory CH3 this signifies that another (trash) page TP is stored or is being stored therein. When either of these found bits FB has a logic value '1' this signifies that the control page CP is still being acquired).

F6: EXT - this is an instruction to exit the programme when the control page CP is still being acquired.

F7: DPpf? - this step is entered into when step F3 determines that the flag CPpf =0, and is an instruction for determining whether (Y) or not (N) a flag DPpf in the processor means PM is set (=1) or cleared (=0). (When a data page DP is currently being acquired in the memory chapter CH1 (or CH2), as signified by FB/DP1 =0 (or FB/DP2 =0), this flag DPpf =1).

F8 FB/CP-TP - this step is entered into when the flag DPpf is set, and is an instruction requiring the processor means PM to get the found bit FB/CP from the chapter memory CH0 and also the found bit FB/TP from the chapter memory CH3.

F9: FB=0? - this is an instruction to determine whether either of the found bits FB which have been obtained are at logic value '0'.

(When FB/CP =0 in the chapter memory CH0 this signifies that a control page CP is stored or is being stored therein. Likewise, when FB/TP =0 in the chapter memory CH3 this signifies that another (trash) page TP is stored or is being stored therein. When either of these found bits FB has a logic value '1' this signifies that the data page DP is still being acquired).

F10: EXT - this is an instruction to exit the programme when the data page DP is still being acquired.

F11: CLR CPpf - when step F5 determines that the found bit FB in SET CPepd either chapter memory CH1 (or CH2) or chapter memory and CH3 has a logic value '0' this WR FB/CP instruction F11 is entered into and requires the processor means PM to clear the flag CPpf, to set another flag CPepd, and to write a bit of logic value '1' for the found bit FB/CP in the chapter memory CH0. (The clearing of the flag CPpf signifies that the control page is no longer being acquired and the setting of the flag CPepd signifies that the entire control page has been received. The bit FB/CP =1 in the chapter memory CH0 signifies that the control software action for receiving the control page has been completed).

F12: CLR DPpf - this instruction corresponds to the instruction in SET DP epd step F11 but it is carried out in respect of a data
WR FB/DP page DP1 (or DP2) when either FB/CP =0 in the memory chapter CH0, or FB/TP =0 in the memory chapter CH3 as determined by step F9.

F13: FB/DP=0? - this is an instruction to determine whether the found bit FBDP1 (or FB/DP2) obtained by step F4 in the memory chapter CH1 (or CH2) is at logic value '0'. If it is not, then the programme is exited at step F14. If this found bit is at logic value '0', signifying that a data page is being stored in the relevant chapter memory, step F15 is entered into.

F14: EXT - this is an instruction to exit the programme as just mentioned.

F15: SET DPpf - this instruction requires the processor means PM to CLR DPepd set the flag DPpf, to clear another flag DPepd, and WR FB/TP to write a bit of logic value '1' for the found bit FB/TP in the chapter memory CH3. (The setting of the flag DPpf signifies that a data page is being acquired and the clearing of the flag DPepd prepares for the subsequent setting of this latter flag when the entire data page has been received. The bit PB/TP is set to 0 in response to the next page header when it is received to provide an end-of-page indication for the page immediately preceding that page header).

F16: EXT - this is an instruction to exit the programme. F17: FB/CP=0? - this is an instruction to determine whether the found bit FB/CP obtained by step F8 in the memory chapter CH0 is at logic value '0'. If it is not, then the programme is exited at step F18. If this found bit is at logic value '0', signifying that a control page CP is being stored in the chapter memory CH0, step F19 is entered into.

F18: EXT - this is an instruction to exit the programme as just mentioned.

F19: SET CPpf - this instruction corresponds to the instruction in CLR CPepd step F15 but it is carried out in respect of the WR FB/TP control page CP.

F20: FB/DP-CP - this is an instruction requiring the processor means PM to get the found bits FB from the chapter memories CH1 (or CH2) and CH0.

F21: FB/CP=0? - this step coresponds to step F17 and leads into step F19 when FB =0 in the chapter memory CH0.

F22: FB/DP=0? - this step corresponds to step F13 and leads into step F15 when FB =0 in the chapter memory CH1 (or CH2).

F23/24: EXT - these are instructions to exit the programme.

Figure 4:
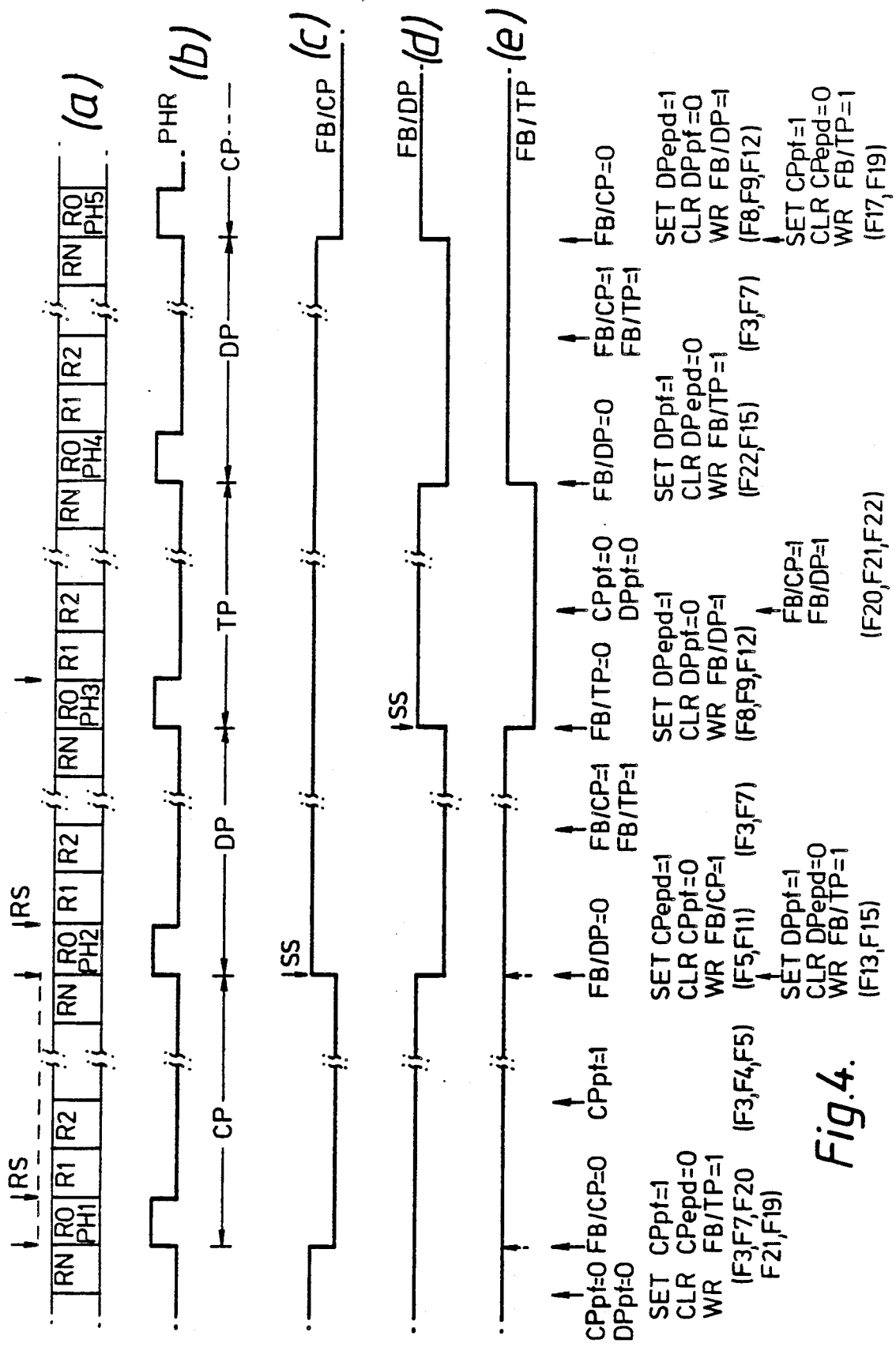
FIG. 4 is a timing diagram showing the time relationships of various of the steps in the flow chart of FIG. 3.

The overall operation of the flow chart of FIG. 3 may be summarised, as follows, with reference to the timing diagrams of FIG. 4. Diagram (a) represents a teletext transmission in which the blocks RO--RN signify successive data rows. Each block RO signifies a page header row of which five, PH1 to PH5, are shown. The data rows RO(PH1) to RN contain data for a control page CP, the data rows RO(PH2) to RN contain data for a data page DP, the data rows RO(PH3) to RN contain data for a trash page TP, the data rows RO(PH4) to RN contain data for a second data page DP, and the page header RO(PH5) is for a second control page CP.

Diagram (b) shows the output logic levels from the flip-flop PHR. The output logic levels from each of the flip-flops FB0 to FB3 which form the found bits FB are represented by diagrams (c), (d) and (e), respectively.

At the time that the page header RO(PH1) is received both the flags CPpf and DPpf are cleared, so that step F20 is entered via steps F3 and F7 to obtain FB/DP and FB/CP in step F20. Step F19 is then entered into because step F21 detects FB/CP = 0. Because CPpf = 1 is now detected by step F3, steps F4 and F5 are entered periodically. When the page-header R0(PH2) has been received, FB/DP = 0 to allow step F11 to be entered to set the flag CPepd which signifies that all the data rows of the control page CP have been received. Because the page-header RO(PH2) relates to the data page DP, step F15 is entered via step F13 to set the flag DPpf. With the flag CPpf reset and the flag DPpf set, step F8 is entered into via steps F3 and F7. When the page-header RO (PH3) has been received, FB/TP = 0 to allow step F12 to be entered into via steps F8 and F9 to set the flag DPepd which signifies that all the data rows of the data page DP have been received. Both the flags CPpf and DPpf are now reset again so that steps F20, F21 and F22 are entered via steps F3 and F7 and are passed through without any change because FB/CP = 1 and FB/DP = 1. When the page-header RO(PH4) has been received, FB/DP = 0 to allow step F15 to be entered into via step F22 to set the flag DPpf. When the page-header RO(PH5) has been received, step F12 is entered into via steps F8 and F9 to set the flag DPepd to signify that all the second data page DP has been received. Because FB/CP = 0, step F19 is next entered into from step F17 to set the flag CPpf.

It can be seen from the foregoing that whenever the page header for a control page or a data page is received, as detected by the logic value '0' of the found bit in the relevant memory chapter, the processor means writes a found bit of logic value '1' into the memory chapter allocated to the trash page. A found bit of logic value '1' will also be stored in the memory chapter for a control page or a data page prior to such pages being received. When the next page header for either a control page or a data page is received, this causes the relevant found bit to be changed to the logic value '0' which is detected by the processor means to set the end-of-page detector flag in respect of the preceding page. If the next page-header is not for a control page or a data page, then the data acquisition circuit will accept the page-header as belonging to a trash page to change the found bit for this trash page to logic value '0' and this again will be detected by the processor means to set the end-of-page detector flag in respect of the preceding page. Depending on the page-header sequence the found bit for the fresh page may already be of logic value '1' when a logic value '1' is written to it.

The flow chart of FIG. 3 also includes a multi-instruction step F25: CPL ACQb, HOL SP, ACQ DP. This instruction step serves to make the two memory chapters CH1 and CH2 available alternately for storing the next acquired data page, even though both these chapters are always allotted to store this page. CPL ACQb is a complement instruction to change the value of a flag ACQb between logic value '1' and '0' to cause the processor means to carry out the other steps of the programme in respect of the two memory chapters in turn as they become available alternately. HOL SP and AQC DP are instructions which identify in the processor means which memory chapter is holding a previously acquired data page (i.e. a shadow page SP) and which memory chapter is being used to acquire the next data page (DP). When the flag ACQb = 1, the memory chapter CH1 is used to acquire the next data page and the memory chapter CH2 holds the shadow page. When the flag ACQb = 0, the memory chapter CH1 holds the shadow page and the memory chapter CH2 is used to acquire the next data page. Because of the priority detector PD of the data acquisition circuit, the chapter CH1 will normally be chosen before chapter CH2 to store the next received data page. Therefore, it only becomes necessary to use the single flag ACQb to select the "hold" or "acquire" function of the memory chapter CH1, because the memory chapter CH2 will then automatically have the alternate function. Because of the toggling action in respect of alternate data pages, the instruction WR FB/DP in step F12 is now carried out after step F25.

What is claimed is:

1. A teletext decoder for teletext information comprising a plurality of different pages each of which is identified by a respective page number, said teletext decoder comprising:
   processor means,
   a multi-page memory having a plurality of memory portions for storing the different pages on a priority basis,
   means for selecting given ones of the different pages by their respective page number in preparation for storing in the memory portions according to an allotment by the processor means, and
   means responsive to the respective page number of a page selected by the selecting means to store a found signal corresponding to a memory portion allotted to the page selected by the selecting means,
   wherein the processor means is operable;
   to allot a particular memory portion for storing a first page,
   to cause the selection means to select the first page in preparation for storing the first page in said particular memory portion,
   to detect a beginning of storing of the first page selected by the selecting means in response to a first stored found signal
   to detect a beginning of storing of a second page selected by said selecting means in response to a second stored found signal, and
   to detect an end of storing of the first page by changing the state of the first found signal in response to the second found signal 2. The teletext decoder of claim 1 wherein the processor means is operable to test for the first and second found signals.

3. The teletext decoder of claim 1 wherein each memory portion includes a respective single bit location for storing a respective found signal in the form of a single bit, the single bit having one logic value when the processor means has allotted such memory portion to one of the different pages, which one page has not been found after being selected by the selecting means, the single bit having a second logic value when the one page has been found.

4. The teletext decoder of claim 3 wherein the processor means is operable to change a value of the single bit from the second logic value to the first logic value when a currently selected page is allotted to the respective memory portion.

5. The teletext decoder of claim 1 wherein the processor means is operable to set flags therein representing a respective beginning and end of storage of the page selected by the selecting means.

6. A teletext decoder as claimed in claim 5, characterised in that each of said flags is a single bit which is given one logic value when it is set and the opposite logic value when it is cleared.

7. The teletext decoder of claim 1 wherein the processor means is operable
  to allot first and second particular memory portions to first and second first pages; and
  to cause the first and second particular memory portions to store the first and second first pages alternately, so that the first particular memory portion retains the first first page while the second particular memory portion stores the second first page, with beginning and ends of the first and second first pages being detected between the first and second first pages using first and second first stored found signals.

8. The teletext decoder of claim 7, wherein the processing means is operable to determine from a logic value of a single flag bit which of the first and second particular memory portions is to store a next page selected by the selecting means and which is to retain a current page selected by the selecting means.

9. The teletext decoder of claim 8 wherein
  said first particular memory portion is accorded a higher priority than said second particular memory portion; and
  said single flag bit is associated with said first particular memory portion, so that said second particular memory portion automatically stores the next page when said single flag bit determines that said first particular memory portion is not to store the next page.

10. A method for identifying an end of a teletext page which is one of a plurality of different teletext pages, the method comprising the following steps:
  (a) allotting a first portion of a multi-page memory to a first teletext page;
  (b) selecting a first teletext page;
  (c) when the first page is found, first storing a first found signal and the first teletext page in the first portion;
  (d) second storing a second found signal and a second teletext page in a second portion of the multi-page memory;
  (e) identifying a beginning of the second page in response to the second stored found signal; and
  (f) identifying an end of the first page by changing a state of the stored first found signal in response to the second stored found signal.

11. A method for identifying an end of a teletext page comprising the following steps in the order given:
  (a) receiving a plurality of teletext pages;
  (b) allotting a first portion of multi-page memory to a first one of the teletext pages;
  (c) first finding the first one of the teletext pages;
  (d) first storing a first logic value for a first found signal in the first portion, to indicate that the first one of the teletext pages is being either stored or sought;
  (e) second storage the first one of the teletext pages in the first portion;
  (f) second finding a second one of the teletext pages;
  (g) third storing the first logic value for a second found signal in a second portion of the multi-page memory, to indicate that the second one of the teletext pages is being either stored or sought; and
  (g) setting the first found signal to a second logic value, to indicate that the end of the first one of the teletext pages has been reached, in response to the first logic value of the second found signal;
  whereby the end of the first one of the teletext pages is identified without embedding an end of page signal in the first teletext page and without loss of the first teletext page.

12. The method of claim 11 wherein
  (a) the first and third storing steps are performed by hardwired data acquisition circuits; and
  (b) the setting step is performed by software in a processor.

13. The method of claim 11 further comprising the step of acquiring a control page.

14. The method of claim 11 further comprising the step of
  maintaining internal flags in a processor, which internal flags represent ends of teletext pages, in response to the found signals.

15. The method of claim 11 further comprising the steps of
  (a) allocating first, second, third, and fourth page locations of the multi-page memory to a control page, a first data page, a second data page, and a trash page, respectively;
  (b) selecting the control, first and second data pages; and
  (c) selecting a range of trash pages.

16. The method of claim 15 further comprising the steps of
  (a) alternating acquisition of the first and second data pages, and
  (b) using a beginning of the trash page to signify an end of any other page.

* * * * *